United States Patent
Raphael et al.

(10) Patent No.: US 11,250,527 B2
(45) Date of Patent: *Feb. 15, 2022

(54) PROVIDING NEAR REAL-TIME AND EFFECTIVE LITIGATION MANAGEMENT FOR MULTIPLE REMOTE CONTENT SYSTEMS USING ASYNCHRONOUS BI-DIRECTIONAL REPLICATION PIPELINES

(71) Applicant: International Business Machines Corporation, Armonk, NY (US)

(72) Inventors: Roger C. Raphael, San Jose, CA (US); Ronald L. Rathgeber, Tustin, CA (US); Rajesh M. Desai, San Jose, CA (US); Gabriel Valencia, Gilroy, CA (US); Justo Perez, Salinas, CA (US); William Russell Belknap, San Jose, CA (US); Sudhakar Basireddy, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 360 days.

This patent is subject to a terminal disclaimer.

(21) Appl. No.: 16/443,871

(22) Filed: Jun. 18, 2019

(65) Prior Publication Data

US 2019/0304041 A1 Oct. 3, 2019

Related U.S. Application Data

(63) Continuation of application No. 15/878,343, filed on Jan. 23, 2018, now Pat. No. 11,100,598.

(51) Int. Cl.
*G06Q 50/18* (2012.01)
*G06F 16/93* (2019.01)
*G06F 16/27* (2019.01)

(52) U.S. Cl.
CPC .......... *G06Q 50/18* (2013.01); *G06F 16/273* (2019.01); *G06F 16/93* (2019.01)

(58) Field of Classification Search
CPC .............................. G06F 16/273; G06Q 50/18
See application file for complete search history.

(56) References Cited

U.S. PATENT DOCUMENTS 8,442,950 B2     5/2013   D'Souza et al.
9,830,333 B1 *  11/2017   Wisniewski .......... G06F 16/273
(Continued)

FOREIGN PATENT DOCUMENTS

WO         2008005135 A1      1/2008

OTHER PUBLICATIONS

Anonymously, "Method and apparatus for fast access to globally distributed enterprise content"; http://ip.com/IPCOM/000206740D, May 5, 2011.

(Continued)

*Primary Examiner* — Julie M Shanker
(74) *Attorney, Agent, or Firm* — Steven M. Bouknight

(57) ABSTRACT

Embodiments generally relate to providing litigation management for multiple remote content systems using asynchronous bi-directional replication pipelines. In some embodiments, a method includes retrieving, at one or more inbound replicators of one or more respective bi-directional pipelines, metadata associated with documents stored in one or more content repositories. The method further includes resolving, at a governance control hub, conflicts associated with legal holds on one or more of the documents based on the metadata. The method further includes sending conflict resolution results from one or more outbound applicators of the bi-directional pipelines to the content repositories, where the content repositories enforce legal holds on the documents.

7 Claims, 13 Drawing Sheets

(56) References Cited

U.S. PATENT DOCUMENTS

| | | | |
|---|---|---|---|
| 2006/0265352 A1 | 11/2006 | Chen et al. | |
| 2009/0150866 A1* | 6/2009 | Schmidt | G06Q 90/00 |
| | | | 717/120 |
| 2010/0050231 A1* | 2/2010 | Kilday | G06Q 10/107 |
| | | | 726/1 |
| 2011/0093471 A1* | 4/2011 | Brockway | G06F 16/313 |
| | | | 707/747 |
| 2011/0320494 A1 | 12/2011 | Fisher et al. | |
| 2014/0082749 A1* | 3/2014 | Holland | G06F 21/645 |
| | | | 726/29 |
| 2015/0100550 A1 | 4/2015 | Desai et al. | |
| 2015/0135300 A1 | 5/2015 | Ford | |

OTHER PUBLICATIONS

Anonymously, "System and method to record, transcribe and index a custodian's compliance to a legal notice through a telephonic conversation", http://ip.com/IPCOM/000249126D, Feb. 8, 2017.

Arkfeld, Michael R., "Proliferation of "Electronically Stored Information" (ESI) and Reimbursable Private Cloud Computing Costs", Arkfeld on Electronic Discovery and Evidence (3rd ed.), 2011.

IBM, "Algorithm to do Agent-Less Account Management via Provisioning, Events and Notification in Remote Resources", http://ip.com/IPCOM/000129160D, Sep. 29, 2005.

List of IBM Patents or Applications Treated as Related.

IBM, Smarter Business Dynamic Information with IBM InfoSphere Data Replication CDC (Mar. 2012).

\* cited by examiner

PROVIDING NEAR REAL-TIME AND EFFECTIVE LITIGATION MANAGEMENT FOR MULTIPLE REMOTE CONTENT SYSTEMS USING ASYNCHRONOUS BI-DIRECTIONAL REPLICATION PIPELINES

BACKGROUND

When performing discovery of existing documents, all documents matching the discovery criteria should be found in order to be compliant with the discovery request. This applies to all locations where documents are stored in a given enterprise. For most enterprises, this would include a wide range of content repositories that store electronic documents either at the enterprise level or at the business unit level. Any inability to perform electronic discovery across all content repositories makes the discovery process difficult to perform and can lead to sanctions or other penalties for not being able to provide the full set of content that meets the discovery criteria.

SUMMARY

Disclosed herein is a method for litigation management of remote content systems using bi-directional pipelines to perform conflict resolution, and a system and computer program product as specified in the independent claims. Embodiments are given in the dependent claims. Embodiments can be freely combined with each other if they are not mutually exclusive.

Embodiments provide litigation management for multiple remote content systems using asynchronous bi-directional replication pipelines. In some embodiments, a method includes retrieving, at one or more inbound replicators of one or more respective bi-directional pipelines, metadata associated with documents stored in one or more content repositories. The method further includes resolving, at a governance control hub, conflicts associated with legal holds on one or more of the documents based on the metadata. The method further includes sending conflict resolution results from one or more outbound applicators of the bi-directional pipelines to the content repositories, where the content repositories enforce legal holds on the documents.

In another aspect, the method further includes sending conflict resolution results to a discovery persistence associated with a governance controller hub. In another aspect, the one or more inbound replicators and the one or more outbound applicators operate asynchronously. In another aspect, the one or more inbound replicators continuously track a lifecycle of each document. In another aspect, the metadata includes at least one or more of document creation timestamp, ownership information, department information, repository identification, and document identification. In another aspect, the one or more outbound applicators ensure that a particular document that is on legal hold is not released or deleted until all legal holds applied to that particular document are released. In another aspect, the method further includes monitoring, by the one or more inbound replicators, changes to the documents in the one or more content repositories, and updating the metadata in the discovery persistence based on the monitoring. In another aspect, the method further includes transferring copies of documents subject to a legal hold from one or more unstructured repositories to one or more structured repositories, applying one or more legal holds to the copies of the documents subject to a legal hold in the one or more structured repositories.

DETAILED DESCRIPTION

Embodiments described herein facilitate efficient litigation management. Embodiments provide near real-time and efficient litigation management for multiple remote content repositories using asynchronous bi-directional replication pipelines.

In some embodiments, a system retrieves, at one or more inbound replicators of one or more respective bi-directional pipelines, metadata associated with documents stored in one or more content repositories. The system resolves, at a governance controller hub, conflicts associated with legal holds on one or more of the documents based on the metadata. The system sends conflict resolution results from one or more outbound applicators of the bi-directional pipelines to the content repositories, where the content repositories enforce legal holds on the documents.

Figure 1:
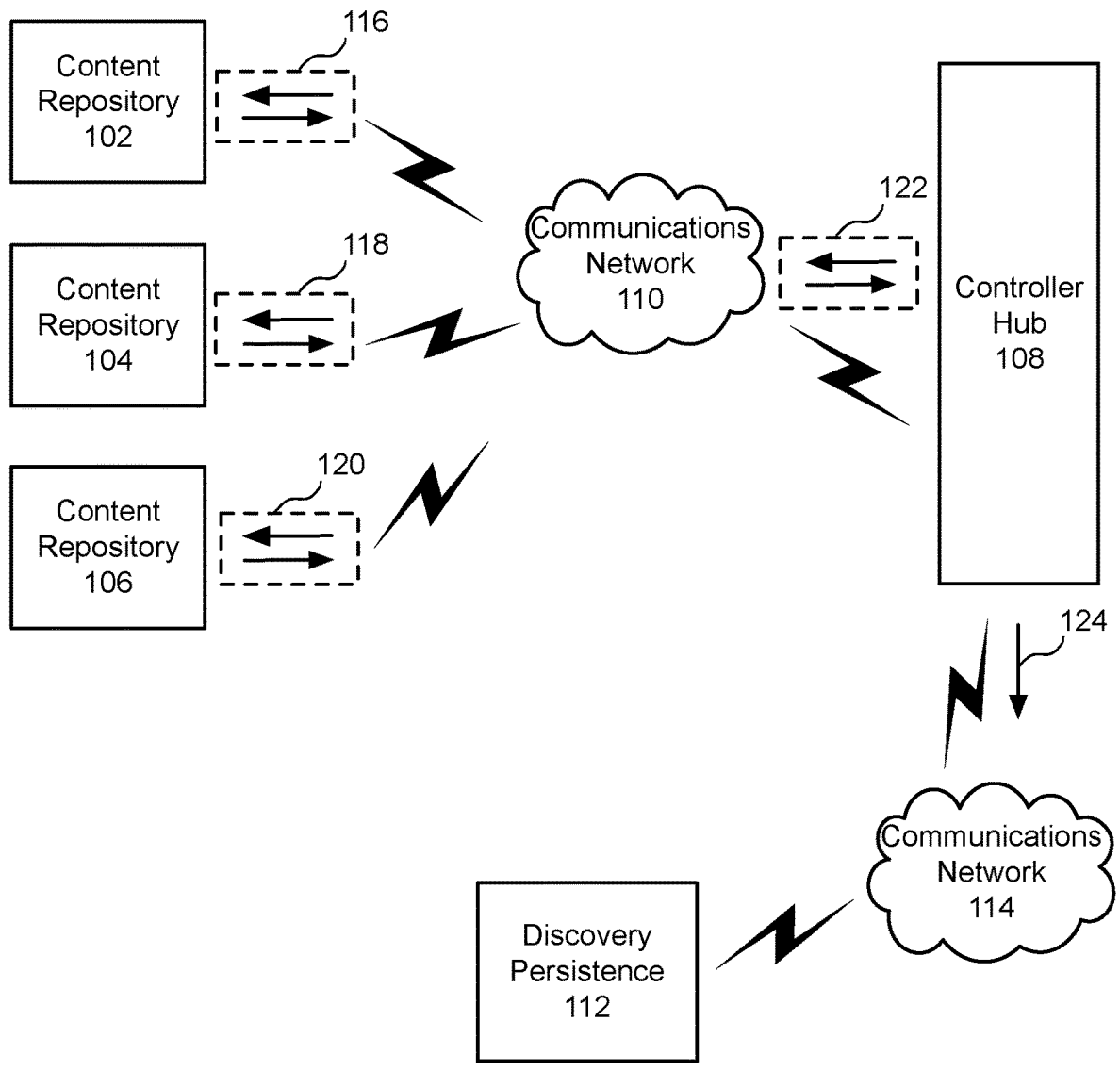
FIG. 1 is an example environment for facilitating efficient litigation management, according to some embodiments.

FIG. 1 is an example environment 100 for facilitating efficient litigation management, according to some embodiments. In various embodiments, environment 100 may be, for example, a litigation environment having a large number of objects or items stored at multiple repositories at different locations. Shown are content repositories 102, 104, and 106 that communicate with a controller hub 108 via a communications network 110. The content repositories 102, 104, and 106 are remote to the controller hub 108. The controller hub communicates with discovery persistence 112 via a communications network 114.

Also shown are bi-directional pipelines 116, 118, and 120. Each bi-directional pipeline 116, 118, and 120 is a persistent queue of state changes in the objects within the repositories. Bi-directional pipeline 116 corresponds to content repository 102. Bi-directional pipeline 118 corresponds to content repository 104. Bi-directional pipeline 120 corresponds to content repository 106. The inbound replicators (inbound to the controller hub 108) are indicated by arrows to the right. The outbound applicators (outbound to the content repositories 102, 104, and 106) are indicated by arrows to the left. In various embodiments, the replication pipeline is bi-directional in nature, with changes in the source repositories being continuously processed and updated in the discovery persistence 212. Also shown is a bi-directional pipeline 122 associated with the controller hub 108. In some embodiments, there is one bi-directional pipeline for each of the repositories, and one bi-directional pipeline for the controller hub 108. In various embodiments, before a hold is propagated from the controller hub 108 to the respective repository, the controller hub 108 determines which queue the hold request goes to. The controller hub 108 determines this from the repository identifier (ID) and repository document ID known to the controller hub 108.

In various embodiments, an inbound replicator continuously tracks the lifecycle of an object or content item object, and an outbound applicator continuously applies a legal hold or life cycle decisions to target content repositories based on actions performed by legal personas in the controller hub 108. For example, the inbound replicator sends information or metadata associated with the content in the content repositories to the controller hub 108, and the outbound applicator sends commands associated with hold and release operations from the controller hub 108 to the content repositories 102, 104, and 106.

In various embodiments, both directions of each bi-directional pipeline 116, 118, and 120 are asynchronous with consistency implementation at the controller hub 108. In some special embodiments an actual applicator or replicator that feeds the pipelines may be embedded in the remote content repositories 102, 104, and 106. Also shown is an index pipeline 124. Operations of bi-directional pipelines 116, 118, 120, 122, and index pipeline 124 are described in more detail herein.

For ease of illustration, FIG. 1 shows three content repositories 102, 104, and 106, one controller hub 108, one discovery persistence 112, and two communications networks 110 and 114. Blocks 102, 104, 106, 108, 110, 112, and 114 may represent multiple systems. In other implementations, the environment 100 may not have all of the components shown and/or may have other elements including other types of elements instead of, or in addition to, those shown herein.

As described in more detail herein, the controller hub 108 extracts content and information on the content in the content repositories 102, 104, and 106, and adds content and information on the content to the discovery persistence 112.

In various embodiments, the discovery persistence 112 is a replica unit that is used to store information about the content from the content repositories 102, 104, and 106. As such, all information, or metadata, needed to perform discovery across an enterprise is stored in a single repository, discovery persistence 112. This is beneficial in that the content repositories 102, 104, and 106 do not have tools or extensive metadata to support discovery. Also, the discovery persistence 112 is a centralized repository that stores information about content in any and all of the remote content repositories in an enterprise including those repositories that do not support a discovery process.

By moving information about the content to the discovery persistence 112, there is a single, centralized location where information can be found. In various implementations, only the information about the content is moved to the discovery persistence 112. In some embodiments, the actual content is text indexed, but is not permanently copied to the discovery persistence 112. For example, the content may be extracted, stored in the discovery persistence 112, indexed, and then deleted from the discovery persistence 112. In some embodiments, for efficient advance query support, only a subset of documents related to a legal case is processed as such.

In various embodiments, the information about the content may include any metadata provided by the content repository, including system information such as creator, date created, etc., along with any custom metadata supported by the content repository. Once this information is extracted from the content repositories, the discovery persistence 112 may be used to perform the discovery process to find the information in the enterprise that meets the criteria for a discovery request.

Additionally, to provide additional information about the content, the actual content can be text indexed with the index information being stored in the discovery persistence 112. This provides additional information about the content including the remote repository ID, which can then be used to find content that matches a discovery request.

For text indexing purposes, the content may be temporarily copied to the discovery persistence 112 and then passed to a text index engine. In some embodiments, the content copy is then deleted so that the copy in the content repository remains the sole version of the content. If the content is later updated in the content repository, the indexing operation is repeated to include any changes made to the content.

Because the environment 100 can support multiple content repositories 102, 104, and 106, there can be content from a single custodian in each of these content repositories 102, 104, and 106. Additionally, the custodian in question may have different identities in each of the content repositories. When searching for content associated with a custodian, each of the content repositories may be searched for applicable content, including resolving the various aliases for that custodian used in each of the content repositories.

While the controller hub 108 performs embodiments described herein, in other embodiments, any suitable component or combination of components associated with the controller hub 108 or any suitable processor or processors associated with the controller hub 108 may facilitate performing the embodiments described herein. In various embodiments, the environment 100 may not have all of the components shown and/or may have other elements including other types of components instead of, or in addition to, those shown herein.

Figure 2:
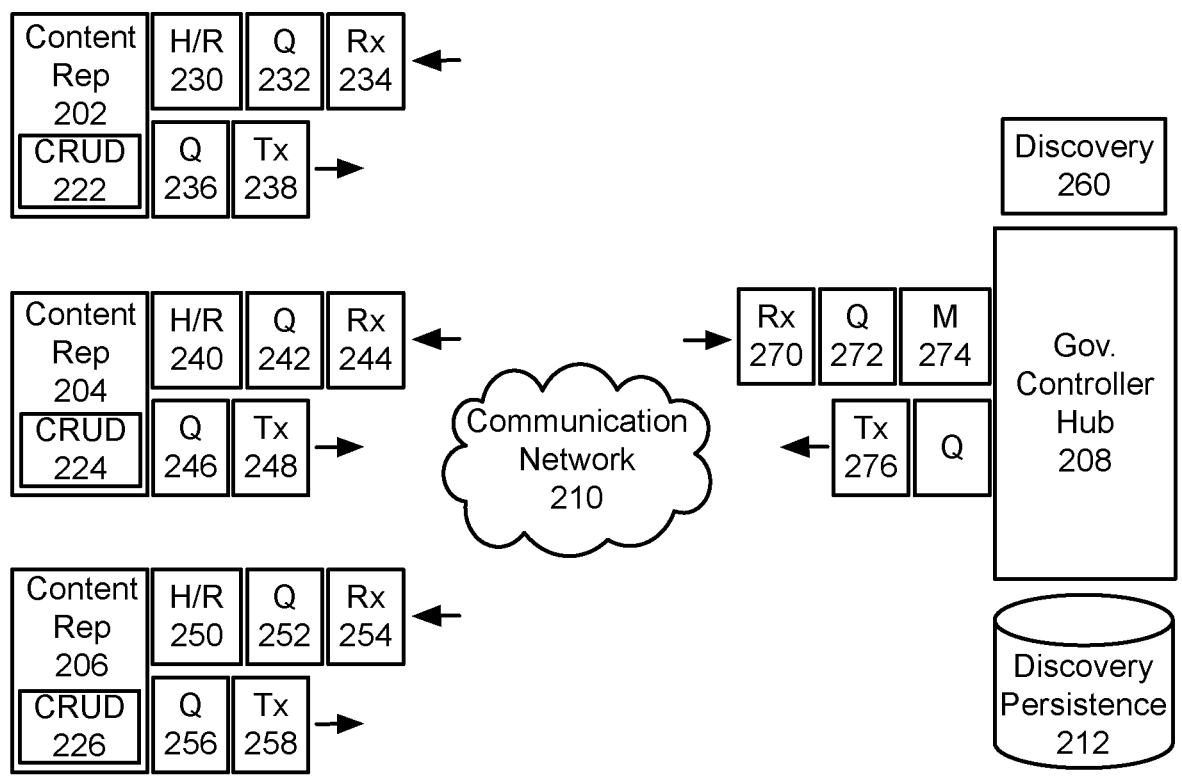
FIG. 2 is a more detailed example environment for facilitating efficient litigation management, according to some embodiments.

FIG. 2 is a more detailed example environment 200 for facilitating efficient litigation management, according to some embodiments. In various embodiments, the components shown are globally time synchronized across all content repositories and the controller hub. Also, the controller hub has privileged access to all content repositories.

Shown are content repositories 202, 204, 206, a governance controller hub 208, all of which communicate over a communication network 210. The governance controller hub 208, controller hub 208 is associated with a discovery persistence 212. The content repositories 202, 204, 206 include respective create, read, update, and delete (CRUD) application layers 222, 224, and 226, where each CRUD application layer has operations that provide four basic functions of persistent storage. Operations of the CRUD application layers are described in more detail herein.

Content repository 202 is associated with a hold-release application layer 230, an incoming queue 232, a receiver 234, an outgoing queue 236, and a transmitter 238 or sender 238, which form a bi-directional pipeline (indicated by arrows in FIG. 2). Similarly, content repository 204 is associated with a hold-release application layer 240, an incoming queue 242, a receiver 244, an outgoing queue 246, and a transmitter 248 or sender 248. Content repository 206 is associated with a hold-release application layer 250, an incoming queue 252, a receiver 254, an outgoing queue 256, and a transmitter 258 or sender 258. Operations of these components are described in more detail herein.

Governance controller hub 208 is associated with a discovery unit 260, a receiver 270, an incoming queue 272, a metadata application layer 274, a transmitter 276 or sender 276, and an outgoing queue 278. In various embodiments, each queue 272 and 278 may be described as a logical queue that maps to three corresponding physical queues of the respective content repositories 202, 204, and 206. In some embodiments, each logical queue includes the repository ID and the repository document ID (or document ID) in the inbound payload to the governance controller hub 208. Operations of these components are described in more detail herein.

Figure 3:
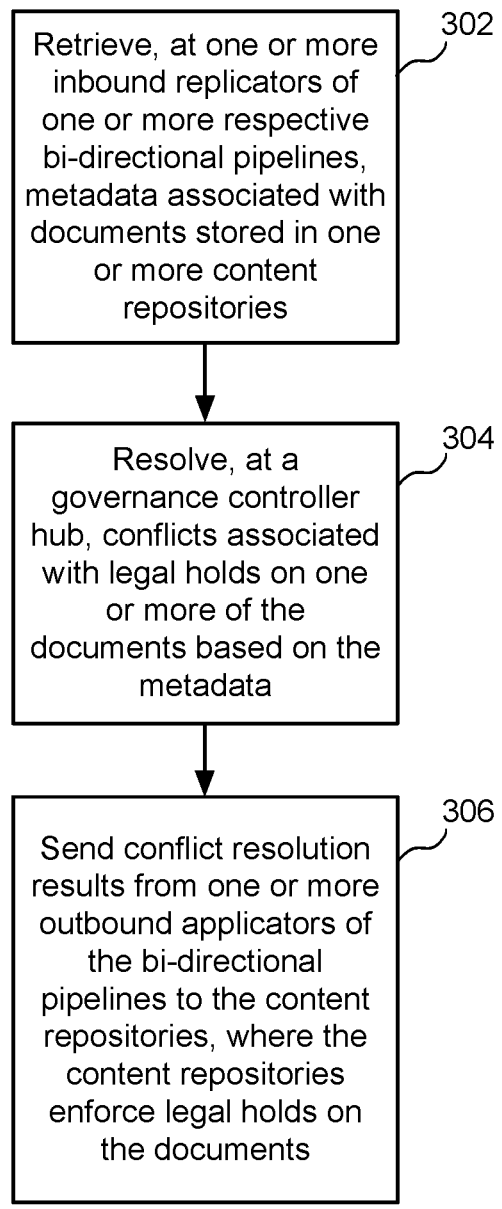
FIG. 3 is an example flow diagram for litigation management of remote content systems, according to some embodiments.

FIG. 3 is an example flow diagram for litigation management of remote content systems, according to some embodiments. As described in more detail herein, embodiments use bi-directional pipelines to synchronize the litigation operations of hold and release and perform necessary conflict resolution. Embodiments achieve a state of governance control between a controller hub and multiple repositories. Referring to both FIGS. 2 and 3, a method begins at block 302, where a system such as the controller hub 208 retrieves, at one or more inbound replicators of one or more respective bi-directional pipelines, metadata associated with documents stored in one or more content repositories. In some embodiments, the metadata includes at least one or more of document creation timestamp, ownership information, department information, repository ID, and document ID. In some embodiments, the repository ID uniquely identifies the remote content repository. In some embodiments, the document ID is identified in the content repository.

In some embodiments, the one or more inbound replicators and the one or more outbound applicator operate asynchronously. In some embodiments, the one or more inbound replicators continuously track a lifecycle of each document.

In various embodiments, controller hub 208 uses the bi-directional pipelines to manage the discovery persistence 212. In various embodiments, the bi-directional pipelines are continuous queues of state changes in objects associated with the content in the content repositories 202, 204, and 206. The bi-directional pipelines provide continuous asynchronous bi-directional state replication between the controller hub 208 and the content repositories 202, 204, and 206. In various embodiments, the state changes are transferred from repositories to the controller hub 208 in the first replication direction. In the reverse direction, the controller hub 208 may send information associated with hold operations initiated by the controller hub 208 to individual repositories. For example, a reverse-direction replication pipeline transfers governance decisions back to the individual repositories. Such governance decisions may involve hold and release operations. Embodiments have various applications such as electronic discovery, e-discovery, records management, life cycle management, etc. Example embodiments directed to the retrieving of metadata associated with documents stored in one or more content repositories are described in more detail herein.

At block 304, the controller hub 208 resolves conflicts associated with legal holds on one or more of the documents based on the metadata. In some embodiments, the legal holds may originate from the discovery application 260. In various embodiments, content is preserved in the content repository by locking it down and adding security to prevent the modification or deletion of the content. This is why update requests on the documents on hold are a concern. If a specific repository does not support this functionality, then the applicable content can be extracted from that content repository and moved into another repository supporting the lock down capability, or is stored offline (or in the discovery persistence 212) for use in responding to the discovery request. In some embodiments, the controller hub 208 may provide versioning. For example, in some embodiments, the controller hub 208 may allow the repository to create a new version of the content that can be updated. As such, the original version remains as the official locked down legal instance. Example embodiments directed to the lock down process are described in more detail herein. Example embodiments directed to the resolution of conflicts are described in more detail herein.

At block 306, the controller hub 208 sends conflict resolution results from one or more outbound applicators of the bi-directional pipelines to the content repositories, where the content repositories enforce legal holds on the documents. In various embodiments, conflict resolution results ensure that governance actions (e.g., hold operations and release operations) are resolved in the discovery persistence 212. For example, the controller hub 208 may ensure that a particular release operation of an object is not performed unless all hold operations on the object have been removed. In some embodiments, the controller hub 208 sends conflict resolution results to a discovery persistence associated with a governance controller hub. Example embodiments directed to the sending and receiving of conflict resolution results are described in more detail herein.

In various embodiments, the controller hub 208 stores metadata in the discovery persistence 212. As described in more detail herein, the information is stored in an indexed format. In some embodiments, the information may also be stored in an inverted index format, which caters towards efficiently querying the metadata information. In various embodiments, the metadata is then added to the discovery persistence 212 with an entry created for each content item in the repository. As described in more detail herein, the controller hub 208 text indexes the information. For each content item, the actual content is text indexed and this index information is also stored in the discovery persistence 112. As a result, the discovery persistence 212 contains all of the information needed to perform discovery.

In some embodiments, the one or more outbound applicators ensure that a particular document that is on legal hold is not released or deleted until all legal holds applied to that particular document are released.

In some embodiments, the one or more inbound replicators monitor changes to the documents in the one or more content repositories, and update the metadata in the discovery persistence based on the monitoring.

In some embodiments, the controller hub 208 transfers copies of documents subject to a legal hold from one or more unstructured repositories to one or more structured repositories, and applies one or more legal holds to the copies of the documents subject to a legal hold in the one or more structured repositories. In some embodiments, the unstructured repositories may be repositories that are not natively supporting hold operations, or not supporting hold operations with support to updates. For such unstructured repositories, the content may be transferred, where the process of copying is delayed if there is any change (e.g., update, delete, etc.) to the document, such as the mechanism of "copy on write." Common semantics of hold/release are achieved across different repositories with different functional support. In some embodiments, the mechanism of HOLD may be implemented in the content repository itself (e.g., Local ACL, Copy2Preserve, smart local hold implementation, etc.).

In various embodiments, structured repositories are in a class of content repositories that that provide rich metadata models that may be used in the discovery process. Additionally, these content repositories typically provide tools that aid in the discovery process by providing extensive search tools that can be used against the metadata stored in the content repository including information on the people associated with the content, which could be considered custodians.

Unstructured repositories are in a class of content repositories that have limited or non-existent metadata models. These unstructured repositories also do not typically provide tools that will assist in the discovery process. This may limit the ability to perform discovery across all content repositories in the enterprise.

Both classes of repositories are typically very dynamic, with a continual feed of new documents and users as well and updates to existing documents and metadata. Embodiments described herein provide discovery search mechanisms that keep current even with a stream of new content. In some embodiments, if a given content repository does not support sufficient security to insure the integrity of the content in the content repository, the content may be instead be extracted from the content repository and stored in a secure location or another content repository that supports the lock down capability. This ensures indempotency of the content.

Embodiments address standard problems of conflict resolution in the domain of governance. For example, embodiments ensure conflict resolution with respect to governance semantics are met in the forward direction. Embodiments ensure conflict resolution with respect to governance actions (e.g., hold operations and release operations) are also resolved in the discovery persistence.

Asynchronous replication works with the controller hub 208 and repository replication model, because certain actions in the repository implementation are met. For example, one of the primary actions is that delete operations are performed on a repository under duress with respect to the repository and the user. As such, repositories implement the deferred delete of an object until the pipeline from the controller hub 208 to the repository spoke catches up in the time domain. This may be applied to the general case of conflict resolution.

As described in more detail herein, content in the content repositories are secured by a hold (locked down) operation so that they cannot be deleted or modified. In a discovery system, a content item can be subject to multiple discovery requests. The content must be secured as long as it is associated with any discovery requests. It is not until the final discovery request has been ended for a content item, that the content item can be modified or deleted. The system must track the multiple discovery requests to insure that the content items remain secure as long as any discovery requests associated with that item are still active. In various embodiments, the controller hub releases the content after the discovery is completed. In various embodiments, the controller hub 208 is involved even though the hold is supported natively by the content repository. This is because discovery requests span across repositories.

Figure 4:
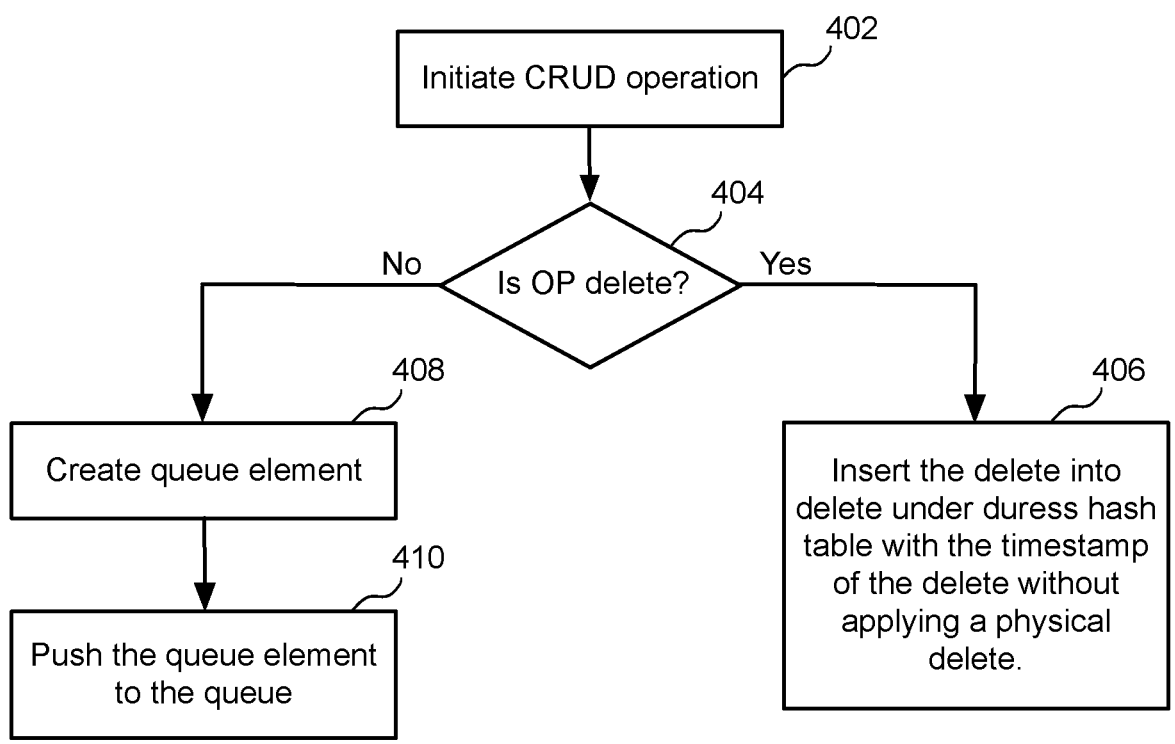
FIG. 4 is an example flow diagram showing operations at the create, read, update, and delete (CRUD) application layer, according to some embodiments.

FIG. 4 is an example flow diagram showing operations at the CRUD application layer, according to some embodiments. In various embodiments, the CRUD operation is performed at the application layer at different crud units (e.g., CRUDs 222, 224, 226, etc.). Referring to both FIGS. 2 and 4, a method begins at block 402, where the CRUD application layer initiates a CRUD operation. As indicated herein, the CRUD operations include create operations, retrieve operations, update operations, and delete operations. In various embodiments, the controller hub 208 is involved in update operations if the hold is not natively supported by the content repository.

At block 404, the CRUD application layer determines if the operation is a delete operation.

At block 406, if the operation is a delete operation, the CRUD application layer inserts the delete into the delete under duress hash table with the timestamp of the delete. Note that the system does not apply the physical delete. This allows time to resolve conflicts before the actual delete occurs, which may include holds. Also, a queue element to be transmitted to the controller hub is not created until a future time. In some embodiments, the timestamp is the time that a CRUD operation was initiated (e.g., the time at which a physical delete operation was initiated, etc.). It does not necessarily mean that the document is physically deleted at this time. It is deleted once the CRUD application layer verifies that no other repositories have a hold on the document.

At block 408, if the operation is not a delete, the CRUD application layer creates a queue element. In some embodiments, the queue element may include any combination of a time stamp of the CRUD operation, a content repository ID, an object ID, a CRUD operation, and a location of the object or content in the content repository. The location of the object may be indicated in a uniform resource identifier (URI) or uniform resource locator (URL). The queue element may also include owner, timestamp, permissions, etc. The queue element may be referred to as object metadata.

At block 410, the CRUD application layer pushes the queue element to the queue. As indicated herein, in various embodiments, the queue is a persistent outbound queue of the content repository.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 5:
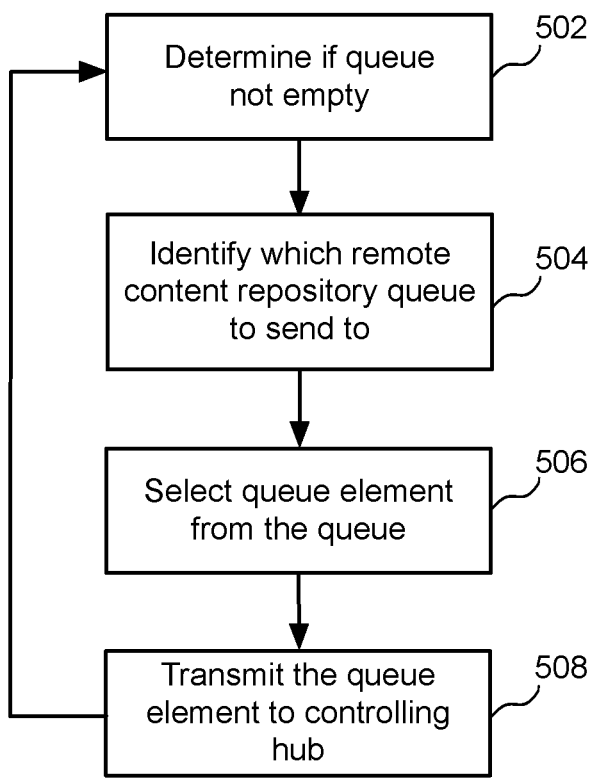
FIG. 5 is an example flow diagram showing operations at a sender, according to some embodiments.

FIG. 5 is an example flow diagram showing operations at a sender (transmitter), according to some embodiments. In various embodiments, the flow diagram of FIG. 5 applies to senders at the content repositories (e.g., senders 238, 248, 258, 276, etc.) and at the controller hub 208. Referring to both FIGS. 2 and 5, a method begins at block 502, the sender determines if there is a queue element in the queue. In other words, the sender determines if the queue has received a queue element for transmission (not empty). For example, the sender 238 may determine if the queue 236 has received one or more elements for transmission.

At block 504, the sender identifies which remote content repository queue to send to. In some embodiments, the sender identifies the remote content repository based on the repository ID.

At block 506, if the queue has a queue element, the sender selects the queue element from the queue. If there are multiple queue elements in the queue, the sender selects the first or top queue element in the queue.

At block 508, the sender transmits the first queue element from the queue to the controller hub 208, where the first element is received at a receiver (e.g., receiver 270) of the controller hub 208. The sender then continues to detect if the queue receives another element for transmission.

Referring again to block 502, if there is no element in the queue (the queue is empty), the sender continues to detect when the queue is not empty (has received an element for transmission).

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 6:
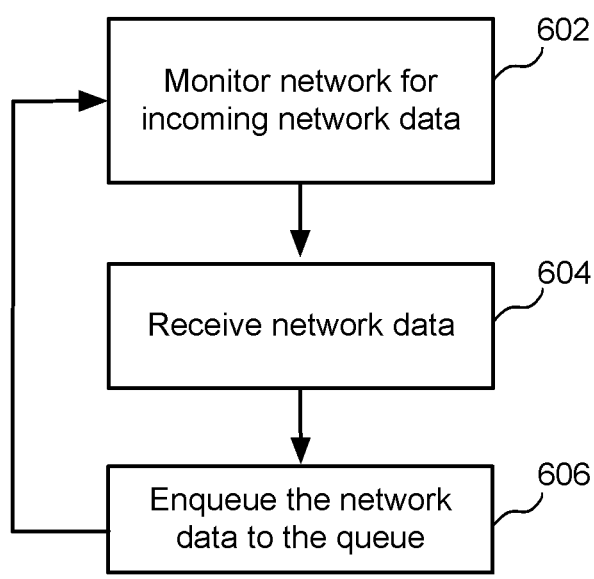
FIG. 6 is an example flow diagram showing operations at a receiver, according to some embodiments.

FIG. 6 is an example flow diagram showing operations at a receiver, according to some embodiments. In various embodiments, the flow diagram of FIG. 6 applies to receivers at the content repositories (e.g., receivers 234, 244, 254, 270, etc.) and at the controller hub 208. Referring to both FIGS. 2 and 6, a method begins at block 602, where a receiver monitors the network for incoming network data. For example, the receiver 270 may monitor communication network 210 for incoming network data.

At block 604, the receiver receives the network data. For example, if the receiver is at the controller hub, the receiver may receive the network data from a sender of the content repository. If the receiver is at a content repository, the receiver may receive the network data from the sender of the controller hub.

At block 606, the receiver enqueues the network data in the queue. For example, the receiver 270 after having received network data from the communication network 210 sends the network data to the queue 272.

Referring again to block 602, the receiver continues to monitor the network for incoming network data.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 7:
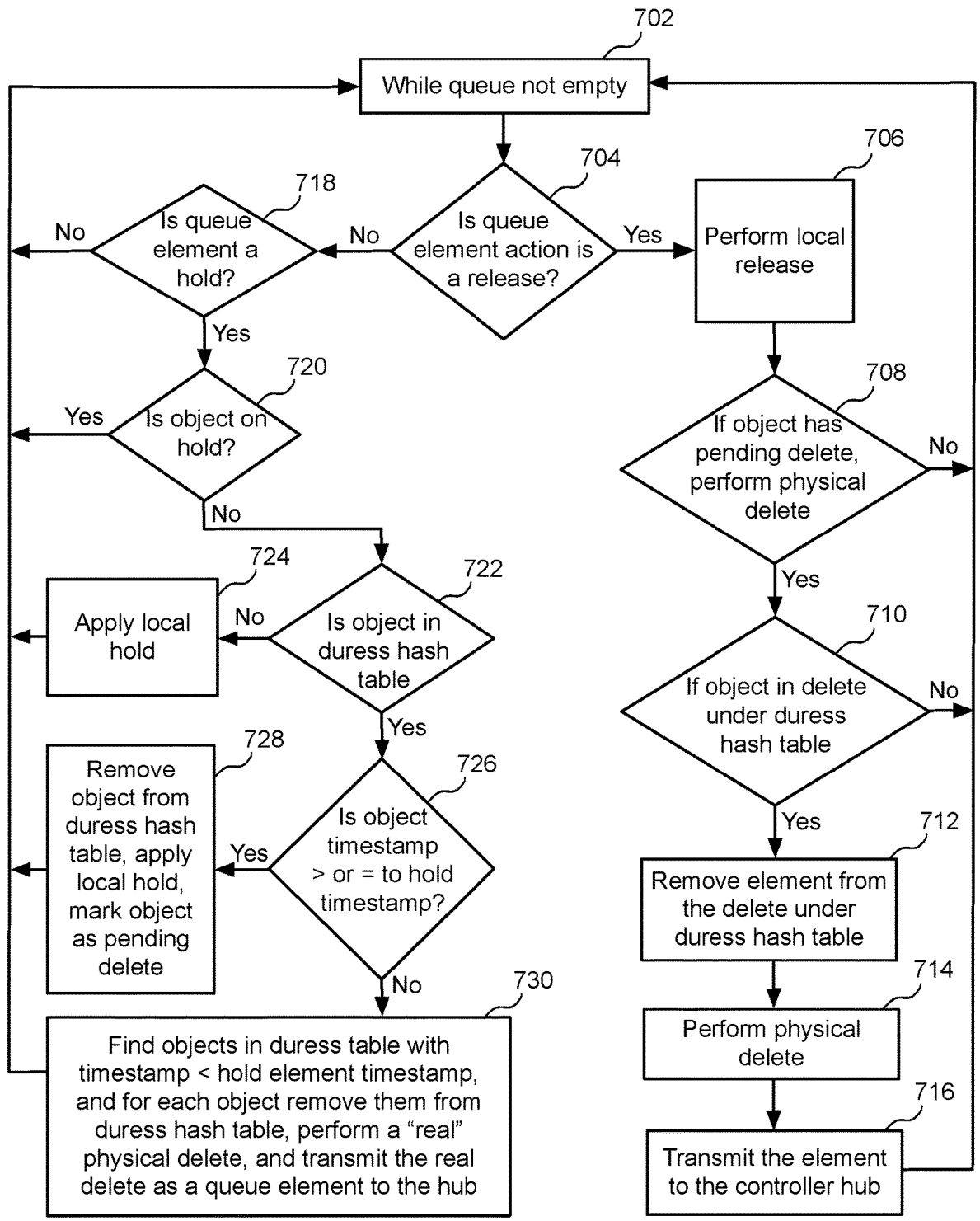
FIG. 7 is an example flow diagram showing operations at a hold-release applicator, according to some embodiments.

FIG. 7 is an example flow diagram showing operations at a hold-release applicator, according to some embodiments. In various embodiments, the hold-release applicators are at the content repositories. Referring to both FIGS. 2 and 7, a method begins at block 702, the hold-release applicator determines if the queue contains an element (not empty).

At block 704, while the queue is not empty, the hold-release applicator determines if the queue element action is a release.

At block 706, if the queue element action is a release, the hold-release applicator performs a local release (e.g., native access control list (NACL) release based, etc.). In some embodiments, the NACL may be a built-in feature in the content repository that places hold/releases on a document for that content repository to prevent it from being deleted (e.g., because it is being held by other content repositories).

At block 708, if the object has a pending delete, the hold-release applicator performs the physical delete. If not, the hold-release applicator determines if the queue contains another element at block 702.

At block 710, if the object has a pending delete and the hold-release applicator performs the physical delete, the hold-release applicator determines if the object is in the delete under duress hash table. If not, the hold-release applicator determines if the queue contains another element at block 702.

At block 712, if the object is in the delete under duress hash table, the hold-release applicator removes the element from the delete under duress hash table.

At block 714, the hold-release applicator performs the physical delete.

At block 716, the hold-release applicator transmits the element from the queue to the controller hub.

At block 718, if the queue element action is not a release, the hold-release applicator determines if the queue element is a hold. If not, the hold-release applicator determines if the queue contains another queue element at block 702.

At block 720, if the queue element is a hold, the hold-release applicator determines if the object is on hold. If yes, the hold-release applicator does nothing to the object and determines if the queue contains another element at block 702.

At block 722, if the object is not on hold, the hold-release applicator determines if the object is in the duress hash table. If not, in block 724, the hold-release applicator applies a local hold (e.g., NACL apply based, etc.).

At block 726, if the object is in the duress hash table, the hold-release applicator determines if the object timestamp in the duress table is greater than or equal to the hold timestamp. If so, at block 728, the hold-release applicator removes the object from the duress table, applies a local hold, and marks the object as pending delete in the content repository. In some embodiments, a pending delete state is used in the hold phase and in the release phase. The hold-release applicator then determines if the queue contains another element at block 702.

At block 730, if the object timestamp in the duress table is less than the hold timestamp, the hold-release applicator finds all objects in the duress table with timestamp less than the hold element timestamp. For each object, the hold-release applicator removes them from the duress hash table, then performs a "real" physical delete and transmits the real delete as a queue element to the hub.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time.

Also, some embodiments may not have all of the steps shown and/or may have other steps instead of, or in addition to, those shown herein.

Figure 8:
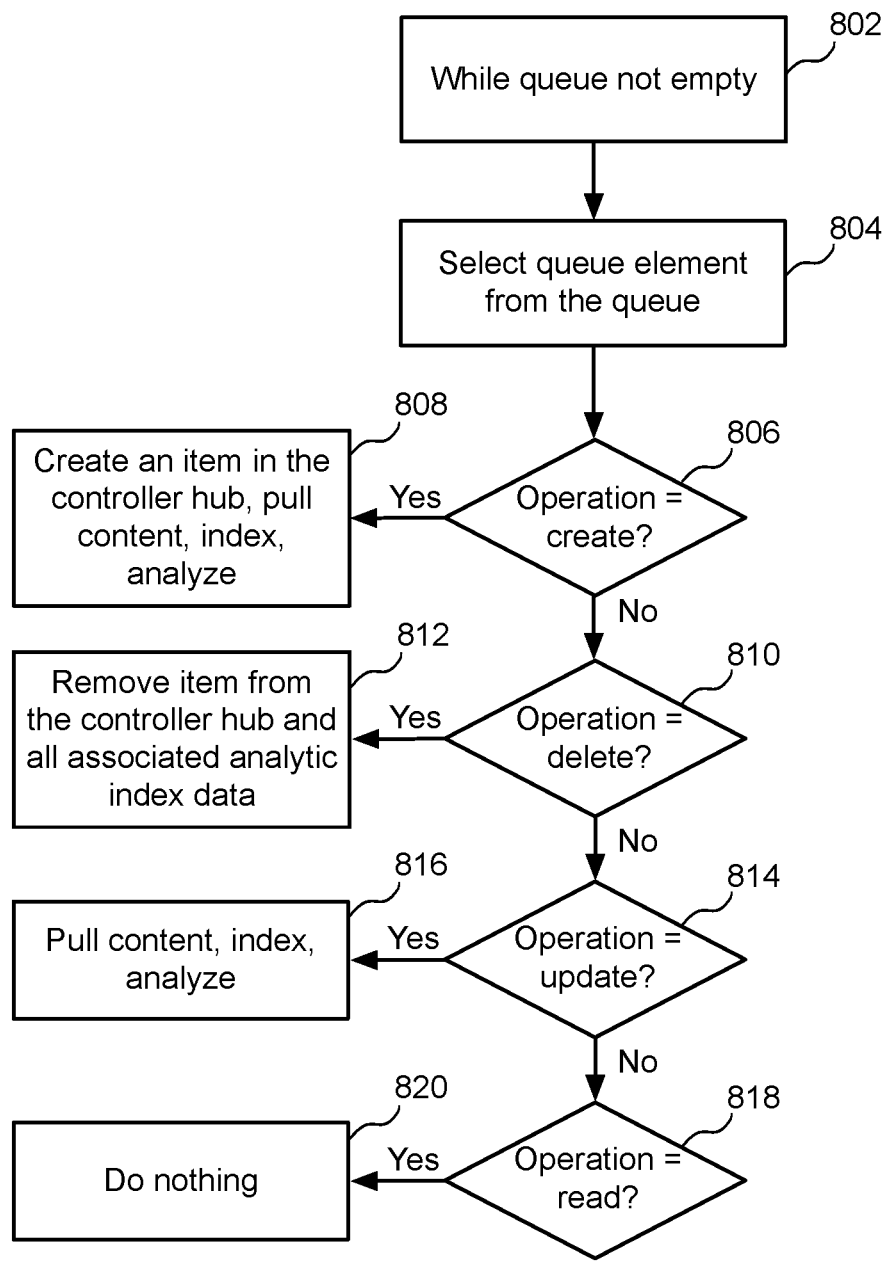
FIG. 8 is an example flow diagram showing operations at a metadata applicator, according to some embodiments.

FIG. 8 is an example flow diagram showing operations at a metadata applicator, according to some embodiments. As indicated herein, the metadata applicator is located at the controller hub. Referring to both FIGS. 2 and 8, a method begins at block 802, where the metadata applicator determines if the queue contains an element (not empty).

At block 804, while the queue is not empty, the metadata applicator selects a queue element.

At block 806, the metadata applicator determines if the operation in the queue element is a create operation. If so, at block 808, the metadata applicator creates an item in the controller hub, pulls content using the URI, indexes/analyses etc. In other words, the metadata applicator extracts content from the document and puts the content into a searchable index that can be used to efficiently query.

At block 810, if the operation is not a create operation, the metadata applicator determines if the operation in the queue element is a delete operation. If so, at block 812, the metadata applicator removes the item from the controller hub and all associated analytic index data, etc.

At block 814, if the operation is not a delete operation, the metadata applicator determines if the operation in the queue element is an update operation. In some embodiments, an update on the hold object is not allowed unless there is repository support native hold or versioning. This is not an issue if the objects are copied to a different location. If the operation in the queue element is an update operation, at block 816, the metadata applicator pulls the content index, analysis, etc.

At block 818, if the operation is not an update operation, the metadata applicator determines if the operation in the queue element is a read operation. If so, at block 820, the metadata applicator does nothing while the read operation is performed.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 9:
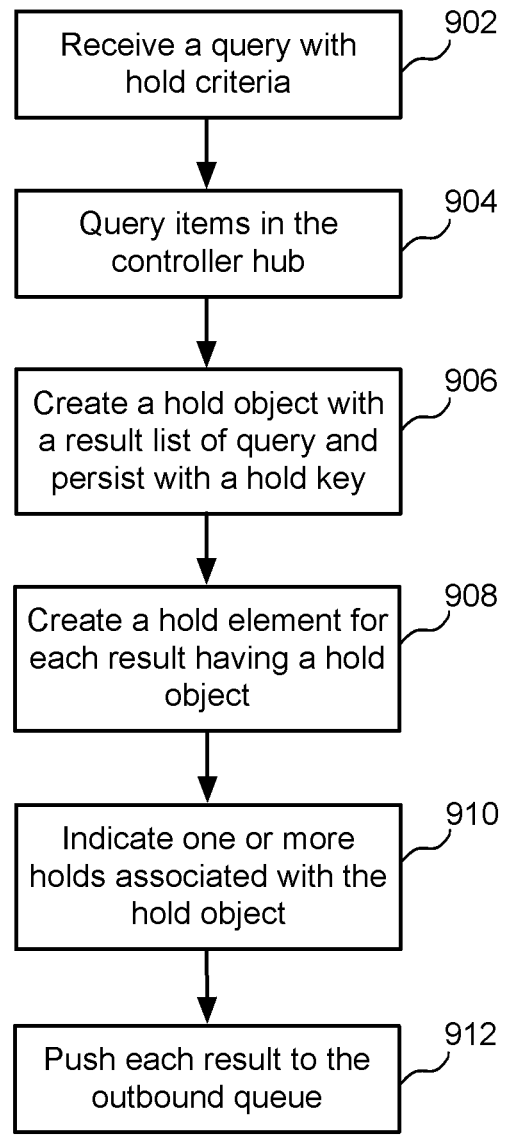
FIG. 9 is an example flow diagram for a hold operation at a discovery application layer, according to some embodiments.

FIG. 9 is an example flow diagram for a hold operation at a discovery application layer, according to some embodiments. In various embodiments, the discovery application layer is at the controller hub. Referring to both FIGS. 2 and 9, a method begins at block 902, where the discovery application layer receives a hold criteria via a query provided by a user. An example of hold criteria is to put every document on hold that was created by a particular person (e.g., John Doe) during a particular time period (e.g., between date A and date B).

At block 904, the discovery application layer queries items in controller hub based on the hold criteria.

At block 906, the discovery application layer creates a hold object with result list of query and persist with a hold key. For example, the discovery application layer may get the list of documents created by particular person (e.g., John Doe) during a particular time period (e.g., between date A and date B). The list of documents that match this query may be referred to as the result list of that query. The discovery application layer takes that list of documents and persist this information in a "named logical" container (e.g., a folder with the name"johndoeresults-xxxx-yyyy-zzzz," etc.).

At block 908, the discovery application layer creates a hold element for each result having a hold object. An example of a hold object is the "johndoeresults-xxxx-yyyy-zzzz" container. Some of the documents in the result list in this container may already have been placed on hold before. If they have been placed on hold before, the discovery application layer may increase a "hold" reference count. If this is the first hold being placed on that document, the discovery application layer then generates a hold element and initializes the hold reference count (e.g., to 1). The discovery application layer then creates a queue element that goes into the outbound hub queue to notify the content repository that this document is now on hold. The queue element is another name for hold element.

At block 910, the discovery application layer indicates one or more holds (e.g., new and/or existing holds on an object. Existing holds be due to another hold request. In various embodiments, new holds are replicated to the repository.

At block 912, the discovery application layer pushes each result to the outbound queue. In some embodiments, the results are sent from the controller hub to the appropriate content repositories to place objects on, or to add additional holds on particular objects, e.g., sent to the appropriate repositories to place holds on them (NACL). In some embodiments, this happens only if the document has not been placed on hold before.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 10:
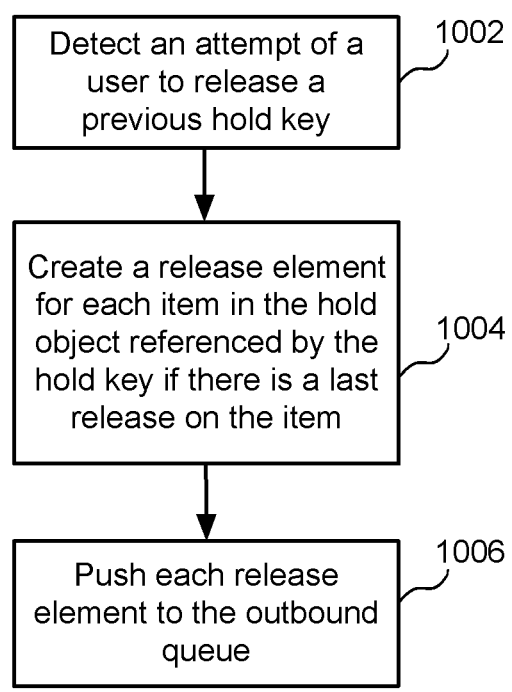
FIG. 10 is an example flow diagram for a release operation at a discovery application layer, according to some embodiments.

FIG. 10 is an example flow diagram for a release operation at a discovery application layer, according to some embodiments. In various embodiments, the discovery application layer is at the controller hub. Referring to both FIGS. 2 and 10, a method begins at block 1002, where the discovery application layer detects an attempt of a user to release a previous hold key. For example, a user may place "John Doe" documents on hold, where a hold key is produced at that time. The hold key in this example is the container name "johndoeresults-xxxx-yyyy-zzzz." At a later time, the user can instruct the controller hub to "release the documents under johndoeresults-xxxx-yyyy-zzzz."

At block 1004, the discovery application layer creates a release element for each item in the hold object referenced by the hold key if there is a last release on the item. In some embodiments, the last release means that the hold reference count goes to zero. If a document was placed on hold 5 times by 5 different hold key requests, the document has been released five times as well. As such, last hold is the same as last release for all practical purposes. The discover application layer detects the last release on the hold object. Also, once the hold reference count goes to zero, the discovery application layer then communicates that to all repositories so they can release the document as well.

At block 1006, the discovery application layer pushes each release element to the outbound queue of the hub. In some embodiments, the release elements are sent from the controller hub to the appropriate content repositories to release objects that are on hold. The discover application layer communicates this to all content repositories once hold reference count goes to zero.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 11:
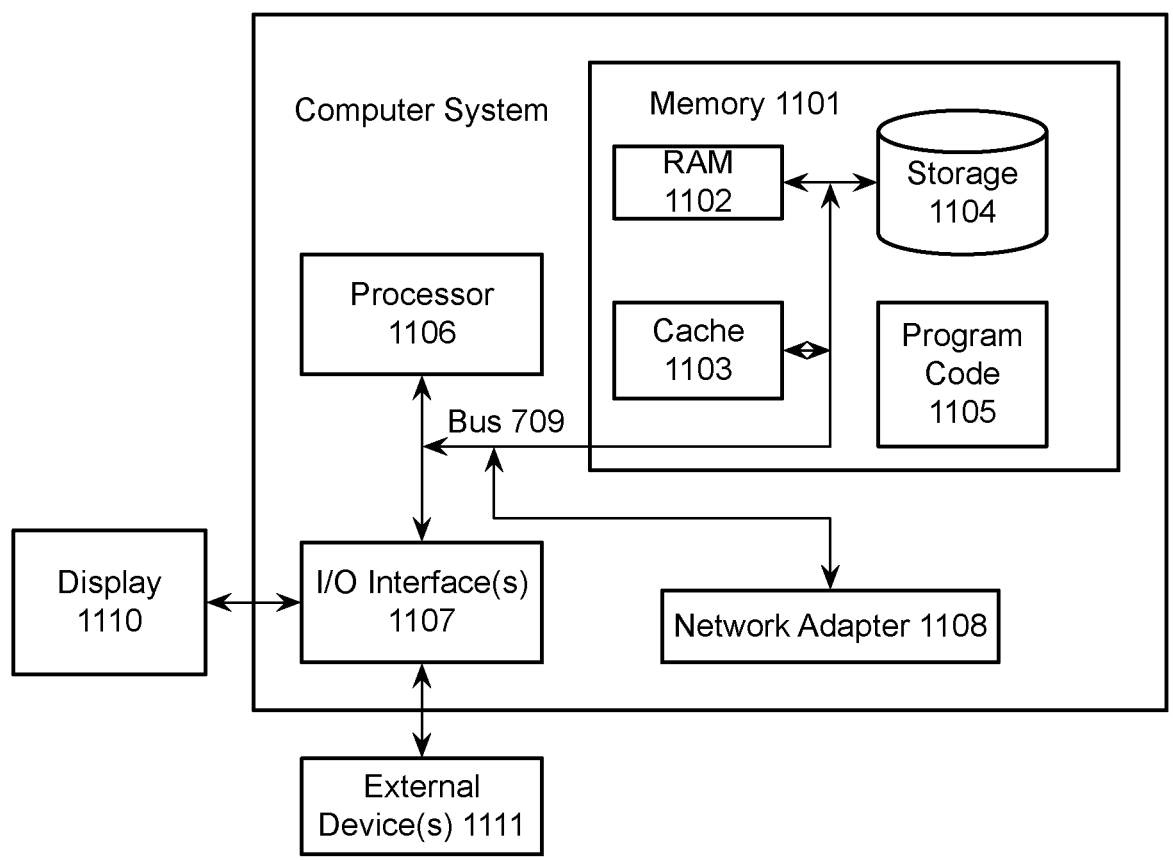
FIG. 11 is a block diagram of an example computer system, which may be used for embodiments described herein.

FIG. 11 is a block diagram of an example computer system 1100, which may be used for embodiments described herein. The computer system 1100 is operationally coupled to one or more processing units such as processor 1106, a memory 1101, and a bus 1109 that couples various system components, including the memory 1101 to the processor 1106. The bus 1109 represents one or more of any of several types of bus structure, including a memory bus or memory controller, a peripheral bus, an accelerated graphics port, and a processor or local bus using any of a variety of bus architectures. The memory 1101 may include computer readable media in the form of volatile memory, such as random access memory (RAM) 1102 or cache memory 1103, or storage 1104, which may include non-volatile storage media or other types of memory. The memory 1101 may include at least one program product having a set of at least one program code module 1105 that are configured to carry out the functions of embodiment of the present invention when executed by the processor 1106. The computer system 1100 may also communicate with a display 1110 or one or more other external devices 1111 via input/output (I/O) interfaces 1107. The computer system 1100 may communicate with one or more networks, such as communications networks 110 and 114, via network adapter 1108. The controller hub 108 may also include many if not all of the components of the computer system 1100.

Various embodiments described herein may be implemented in a cloud computing environment. While some embodiments are described herein in the context of cloud computing, implementation of the teachings recited herein are not limited to a cloud computing environment. Rather, embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include various characteristics, various service models, and various deployment models.

Example characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Example service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Example deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
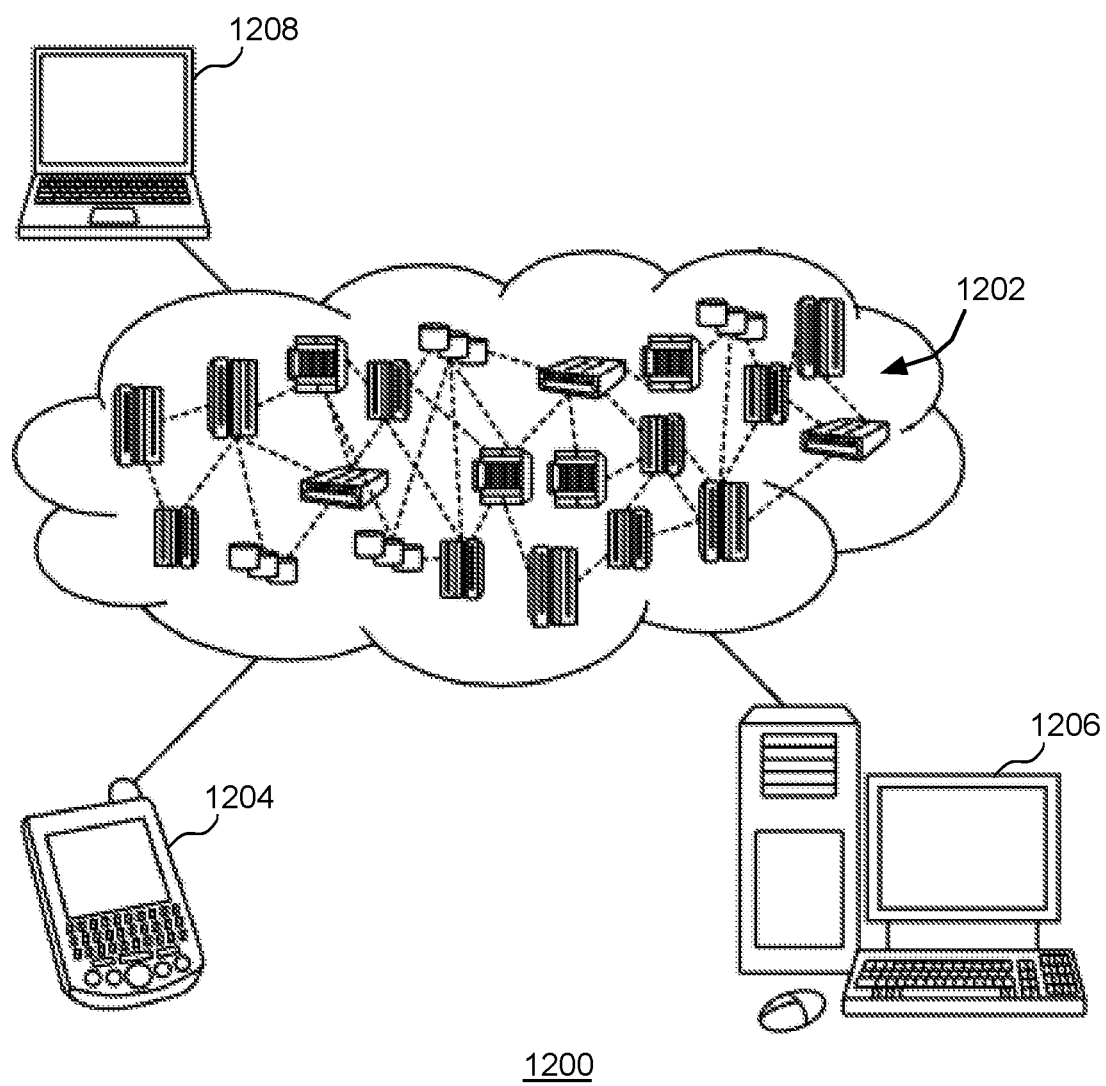
FIG. 12 is a block diagram of a cloud computing environment, according to some embodiments.

FIG. 12 is a block diagram of a cloud computing environment, according to some embodiments. As shown, cloud computing environment 1200 may include one or more cloud computing nodes 1202 with which local computing devices used by cloud consumers, such as, for example, personal digital assistant (PDA) or cellular telephone 1204, desktop computer 1206, laptop computer 1208 may communicate. Nodes 1202 may communicate with one another. They may be grouped (not shown) physically or virtually, in one or more networks, such as Private, Community, Public, or Hybrid clouds as described hereinabove, or a combination thereof. This allows cloud computing environment 1200 to offer infrastructure, platforms and/or software as services for which a cloud consumer does not need to maintain resources on a local computing device. It is understood that the types of computing devices 1204, 1206, and 1208 shown in FIG. 12 are intended to be illustrative only and that computing nodes 1202 and cloud computing environment 1200 can communicate with any type of computerized device over any type of network and/or network addressable connection (e.g., using a web browser).

Figure 13:
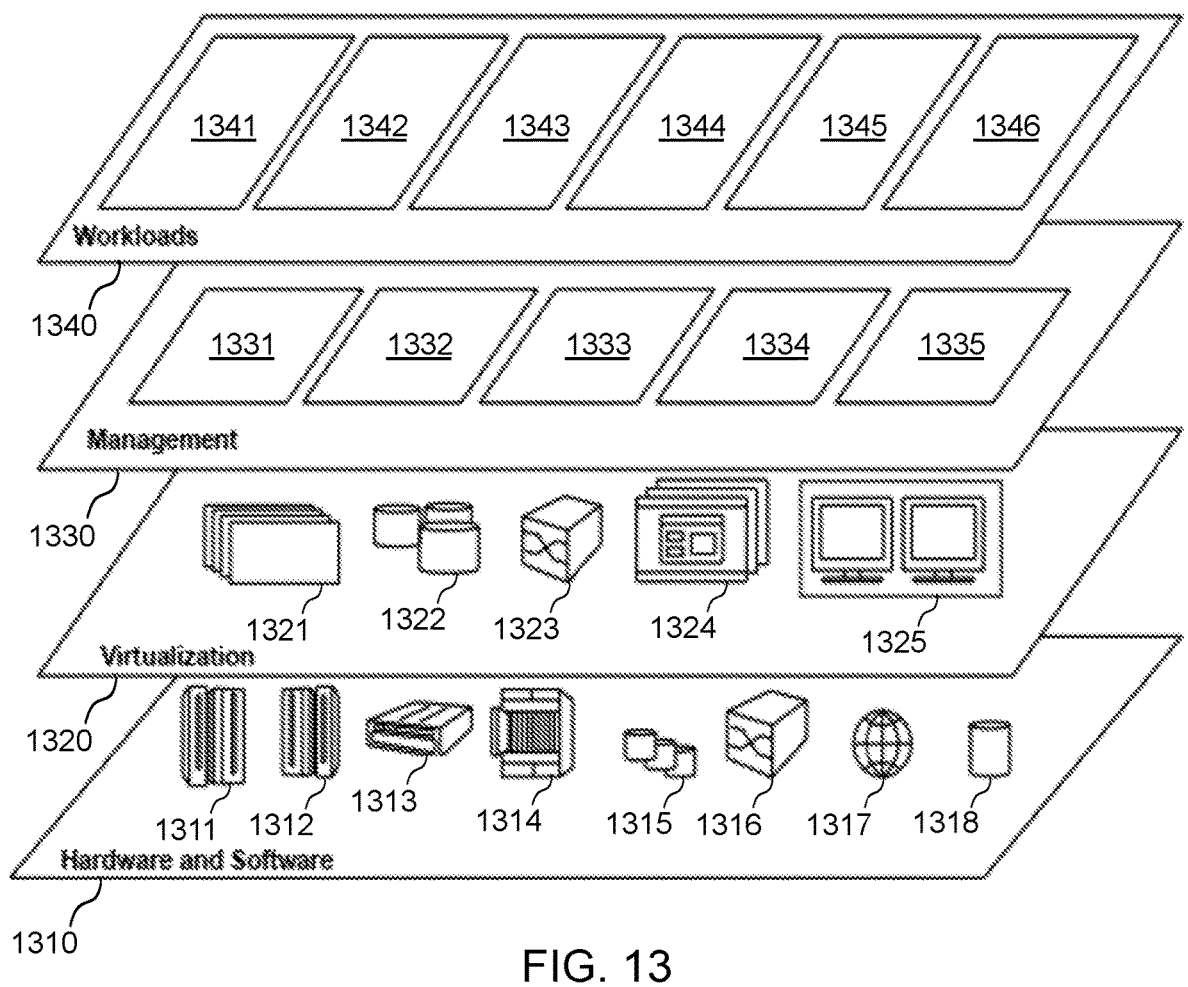
FIG. 13 is a block diagram showing abstraction model layers provided by a cloud computing environment, according to some embodiments.

FIG. 13 is a block diagram showing abstraction model layers provided by a cloud computing environment, according to some embodiments. It should be understood in advance that the components, layers, and functions shown in FIG. 13 are intended to be illustrative only and embodiments are not limited thereto. As depicted, the following layers and corresponding functions are provided.

A hardware and software layer 1310 includes hardware and software components.

Examples of hardware components may include mainframes 1311, reduced instruction set computer (RISC) architecture based servers 1312, servers 1313, blade servers 1314, storage devices 1315, and networks and networking components 1316. In some embodiments, software components include network application server software 1317 and database software 1318.

A virtualization layer 1320 provides an abstraction layer from which the following examples of virtual entities may be provided: virtual servers 1321, virtual storage 1322, virtual networks 1323, virtual private networks, virtual applications, operating systems 1324, and virtual clients 1325.

In one example, a management layer 1330 may provide the functions described below. Resource provisioning 1331 provides dynamic procurement of computing resources and other resources that are utilized to perform tasks within the cloud computing environment. Metering and pricing 1332 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1333 provides access to the cloud computing environment for consumers and system administrators. Service level management 1334 provides cloud computing resource allocation and management such that required service levels are met. Service level agreement (SLA) planning and fulfillment 1335 provide pre-arrangement for, and procurement of, cloud computing resources for which a future requirement is anticipated in accordance with an SLA.

Workloads layer 1340 provides examples of functionality for which the cloud computing environment may be utilized. Examples of workloads and functions, which may be provided from this layer may include a mapping and navigation 1341, software development and lifecycle management 1342, virtual classroom education delivery 1343, data analytics processing 1344, and transaction processing 1345.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for litigation management of remote content systems using bi-directional pipelines to synchronize the litigation operations of hold and release and perform necessary conflict resolution, the method comprising:
retrieving, at one or more inbound replicators of one or more respective bi-directional pipelines, metadata associated with documents stored in one or more content repositories, wherein the one or more bi-directional pipelines provide continuous asynchronous bi-directional state replication between a governance control hub and the one or more content repositories, wherein the one or more content repositories are provided locked down security to prevent the modification or deletion of the documents, and wherein the governance control hub further provides versioning to allow a respective repository to create a new version of a corresponding document for updating such that an original version of the corresponding document remains as a locked down legal instance;
resolving, at the governance control hub, conflicts associated with legal holds on one or more of the documents based on the metadata;
transferring, over a communications network, copies of documents subject to a legal hold from one or more unstructured repositories to one or more structured repositories;
applying one or more legal holds to the copies of the documents subject to a legal hold in the one or more structured repositories, wherein the one or more legal holds originate from a discovery application associated with the governance control hub; and
sending conflict resolution results from one or more outbound applicators of the bi-directional pipelines to the content repositories, wherein the content repositories enforce legal holds on the documents.

2. The method of claim 1, further comprising sending conflict resolution results to a discovery persistence associated with the governance control hub.

3. The method of claim 1, wherein the one or more inbound replicators and the one or more outbound applicators operate asynchronously.

4. The method of claim 1, wherein the one or more inbound replicators continuously track a lifecycle of each document.

5. The method of claim 1, wherein the metadata includes at least one or more of document creation timestamp, ownership information, department information, repository identification, and document identification.

6. The method of claim 1, wherein the one or more outbound applicators ensure that a particular document that is on legal hold is not released or deleted until all legal holds applied to that particular document are released.

7. The method of claim 1, further comprising:
monitoring, by the one or more inbound replicators, changes to the documents in the one or more content repositories; and
updating the metadata in the discovery persistence based on the monitoring.

\* \* \* \* \*